United States Patent [19]

Runge

[11] 4,084,308
[45] Apr. 18, 1978

[54] SLICING METHOD IN FIBER END PREPARATION

[75] Inventor: Peter Klaus Runge, Fair Haven, N.J.

[73] Assignee: Bell Telephone Laboratories, Incorporated, Murray Hill, N.J.

[21] Appl. No.: 743,588

[22] Filed: Nov. 22, 1976

[51] Int. Cl.² ............... B23P 17/00; B23P 25/00
[52] U.S. Cl. .................. 29/527.2; 29/424; 83/14; 264/271; 350/96.10
[58] Field of Search ............ 29/445, 424, 527.1, 29/527.2; 350/96 R; 83/14, 915.5; 264/271

[56] References Cited

U.S. PATENT DOCUMENTS

| | | | |
|---|---|---|---|
| 2,328,302 | 8/1943 | Simison | 29/424 |
| 2,436,819 | 3/1948 | Neidorf | 29/424 X |
| 2,964,443 | 12/1960 | Dereich | 83/14 X |
| 3,247,589 | 4/1966 | Burns | 29/424 |
| 3,445,785 | 5/1969 | Koester et al. | 350/96 R X |
| 3,455,625 | 7/1969 | Brumley et al. | 350/96 R X |
| 3,734,594 | 5/1973 | Trambarulo | 350/96 R X |
| 3,934,773 | 1/1976 | Chinnock et al. | 350/96 R X |
| 4,003,773 | 1/1977 | Grable | 83/14 X |

*Primary Examiner*—Charlie T. Moon
*Attorney, Agent, or Firm*—James F. Hollander

[57] ABSTRACT

One or more glass or other brittle fiber ends are prepared by first embedding the fiber in epoxy or other plastic and then slicing the plastic and the fiber a first time to produce an oblique end face and a second time to produce an end face exhibiting intersecting planes. The slicing is continued with successive advancements of the slicing of approximately one thousandth of an inch to produce a squared end. The technique is applicable to fiber end preparation of single fibers and plural fibers as in optical fiber tapes and cables.

21 Claims, 7 Drawing Figures

SLICING METHOD IN FIBER END PREPARATION

BACKGROUND OF THE INVENTION

The present invention relates to the preparation of ends of fibers. More particularly, the present invention relates to the preparation of high quality optically satisfactory ends in brittle fibers such as glass optical fibers.

In the prior art cylindrical glass optical fibers, which typically include a core of high index glass surrounded by a cladding of lower index glass, have increasingly become valuable in applications requiring the transmission of light through the fibers by the phenomenon of total internal reflection. The utilization of light emerging from optical fibers and the optical connection of optical fiber ends typically require that the ends of the optical fibers be prepared to have a planar (squared) end face perpendicular to the axis of the fiber.

One method that has been proposed for producing a planar end face for an optical fiber involves grasping the fiber in two places, placing it under tension, introducing a bend in the fiber of an appropriate radius, scoring the fiber and breaking the fiber to produce a high quality end. However, this method does not have a perfect 100 percent yield of planar fiber ends; and when an unsatisfactory break is made, it may not be possible to again grasp the remaining length of fiber to repeat the method.

In another method of optical fiber end preparation, the optical fiber end is held in a manner permitting a grinding and polishing operation. However, the end surface quality may be imperfect as a result of the grinding and polishing unless a substantial amount of time is spent in the process.

Accordingly, it is an object of the present invention to both increase the yield in a method of fiber end preparation and to keep the processing time required at a nominal duration.

SUMMARY OF THE INVENTION

According to the present invention a glass or other brittle fiber is embedded in a stiff substance, such as a shrinkably curable epoxy or other form of plastic, with an end portion of the optical fiber exposed at a surface of the substance. When both the plastic and the fiber are sliced, suitably with a diamond wedge, an oblique fiber end plane results. For optical coupling this oblique end is often unsatisfactory. However, the invention recognizes that continuing the slicing of the plastic and the fiber with suitable advancements of the slicing of, for example, approximately 1/1,000 inch (25 microns) or less unexpectedly produces an end of composite geometry featuring the oblique plane intersecting a plane produced by the continued slicing, such as a transverse plane. When the slicing is continued for a few more times, the transverse plane increases in size until a squared, transverse end is obtained in practically every case. Thus, the inventive method provides a simple, rapid way of providing optical fiber ends of either composite geometry or single-plane geometry as the optical coupling or other application may require.

The inventive method is advantageous in many applications where one or more optical fibers are to be embedded in plastic as a matter of course, because an imperfect prior art fracture near the surface of the plastic precludes grasping the fiber so as to tension it and repeat the prior art process. Moreover, applications of embedded fibers are of significant importance. For example, individual fibers are advantageously utilized embedded in molded connector bodies in optical fiber connectors. (See "Optical Fiber Connector and Method of Making", application Ser. No. 630,930 filed Nov. 11, 1975 by the present inventor.) A plurality of fibers in a linear or two dimensional array can be embedded in plastic at the end of an optical fiber tape or cable and sliced according to the invention. In preparing fiber connectors, tapes and cables, the method can be used either alone or in conjunction with prior art optical fiber end preparation methods in order to increase yield by avoiding or salvaging prior art discards. In addition, the simplicity of the method lends itself to use in both hand tool and mass-production machine environments, as appropriate.

While the example of glass optical fibers has been used for illustration, it is to be understood, of course, that the invention is applicable in many cases where brittle fibers require high quality planar and composite planar end preparation.

DETAILED DESCRIPTION OF THE DRAWINGS

Figure 1:
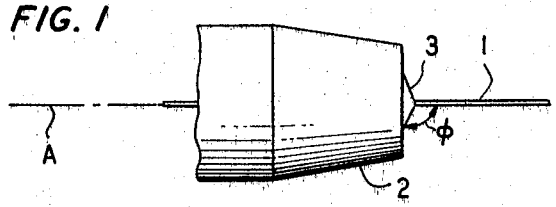
FIG. 1 is a side view of an optical fiber embedded in an optical fiber connector body preliminary to optical fiber end preparation according to the invention.

In FIG. 1 a cylindrical quartz optical fiber 1 illustratively having an outer diameter of 110 microns and a core diameter of 55 microns is embedded in a molded epoxy plastic optical fiber connector body 2 having conical front face 3. The surface of front face 3 is oriented at an angle $\phi$ from the axis A of optical fiber 1. The angle $\phi$ is suitably greater than 90°, 110° having been experimentally used.

Figure 2:
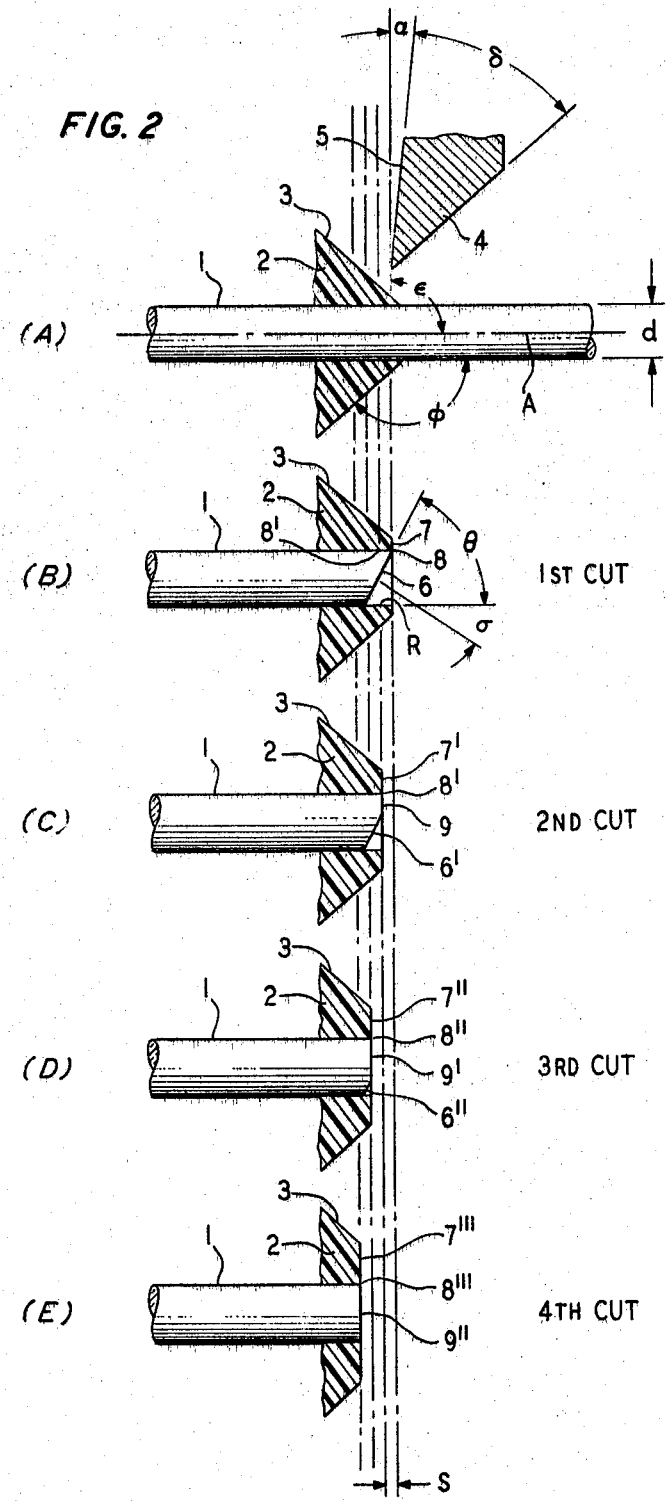
FIGS. 2A, 2B, 2C, 2D and 2E are enlarged cross sections of an optical fiber in plastic as in FIG. 1, showing successive steps in the slicing method of the invention.

FIG. 2A shows an enlarged cross section of the fiber 1 and epoxy 2 of FIG. 1. The fiber diameter $d$ is 110 microns. Fiber 1 is embedded in epoxy material 2 which has the surface 3 oriented at the angle $\phi$ which is shown distorted compared to FIG. 1 for clarity. A suitable substance for the fiber is fused quartz and for the connector body Hysol Epoxy MG6 Mineral Filled as described in U.S. Pat. No. 3,484,398. The epoxy is molded around the quartz fiber and has a shrinking characteristic so that it shrinks as it cures to tightly grasp the fiber and with the fiber form a sliceable composite workpiece. It is to be understood, however, that the named epoxy is only illustrative of many moldable epoxies, polyesters or other plastics which are quite suitable. In general, the plastic is preferably of a type that can be molded around the optical fiber, shrinking and stiffening on it as the plastic cures, and holding it tightly.

A cutting tool such as diamond wedge 4 is brought against and slices through the fiber 1 and epoxy 2 in a slicing plane oriented perpendicular to the axis of the fiber so that the slicing angle $\epsilon$ (epsilon) is 90°. The diamond wedge 4 suitably has a blade angle $\delta$ (delta) small enough (less than $\epsilon$ or 90°) to avoid bending the fiber 1 and large enough (preferably greater than 20°, 50° being satisfactory) to exhibit minimal wear in repetitive slicing operations. The back surface 5 of the diamond wedge 4 is oriented at an angle α from the slicing plane between 0° and 4°, 2° being satisfactory. The diamond wedge 4 is suitably brought against the fiber 1 with a velocity of approximately 1 mil per second (25 microns per second) or less, the maximum value of wedge velocity being mostly limited by wear considerations. The fiber parts with an audible "click," indicating a fracture phenomenon.

FIG. 2B shows the state of the epoxy 2 and fiber 1 after the initial downward slice of FIG. 2A has been made perpendicular to the fiber axis A by cutting wedge 4. A portion of the epoxy 2 and fiber 1 has been cut away and discarded, exposing planar cut plastic surface 7 and oblique cut fiber end surface 6. Wedge 4 has sliced through an epoxy portion and has come against fiber 1 at an initial point 8 from which a fracture resulting in surface 6 has radiated rapidly, following which event the wedge has completed slicing the epoxy. The optical fiber end produced by the first cut exhibits the approximately planar end face having a surface 6 oriented obliquely relative to axis A at an angle $\theta$ of approximately 60° ± 10°. Presented another way, the line normal to the resulting oblique fiber end surface 6 is tilted at an angle $\sigma$ (sigma) equal to 90° − $\theta$ from the optical fiber axis, so $\sigma$ is between 20° and 40° and approximates 30°.

The upper point 8 of the end face surface 6 of fiber 1 at the initiation of the slice is in the same plane as the slicing plane and the planar cut end surface 7 of epoxy 2. The lower portion, or fracture termination portion, of the fiber end face 6 has a recess depth R relative to plastic surface 7 of $$R = d \times \operatorname{ctn} \theta . \qquad (1)$$

R may also be thought of as the longitudinal dimension component of oblique surface 6 along the fiber axis A. In the case of a 110 micron fiber and $\theta = 60°$, the recess depth or longitudinal dimension R is 65 microns (2.6 mils).

Next, the wedge and fiber are readjusted relative to one another so that the wedge can be brought against fiber 1 at a point 8' in the interior of epoxy 2. Then an advancement $s$ can be defined as the distance along axis A between its intersections with perpendiculars geometrically dropped to axis A from points 8 and 8'.

FIG. 2C shows that when a second slice is made after adjusting the slicing plane of the diamond wedge by an advancement $s$ of 25 microns (1 mil or one thousandth inch) or less, it is unexpectedly observed that the optical fiber end exhibits a planar surface portion 9 precisely perpendicular to the fiber axis and coplanar with the transverse slicing plane and epoxy surface 7'. In the process, a portion of the oblique cut fiber end surface 6 of FIG. 2B is replaced with the transverse surface portion 9 of FIG. 2C which is geometrically distinct from the rest of the cut end surface 6'. However, if the advancement $s$ substantially exceeds 1 mil in this example, the oblique fiber end surface 6 having angle $\theta$ relative to axis A and extending substantially across the entire cross-section of the fiber is simply reproduced deeper in the epoxy. Thus, the advancements $s$ to points 8', 8", and 8'" prior to each slice must be less than the longitudinal dimension or recess depth R when R exceeds 1 mil, and in some cases, as just mentioned, not in excess of one half the longitudinal dimension to produce intersecting end surface planes and squared ends.

When one or more additional sufficiently thin slices with prior advancements $s$ of suitably 1 mil or less are made after the first cut of FIG. 2B, the square or perpendicular planar end quality of the optical fiber progressively increases by replacing successive portions of the oblique surface 6 with transverse end portions 9 and 9' coplanar with the surface of the sliced plastic at 7' and 7" respectively as shown in FIGS. 2C and 2D until a perfect optically finished fiber end 9" is obtained as shown in FIG. 2E. In FIG. 2E the entire end surface 9" is coplanar with the planar cut surface 7'" of the plastic 3. However, even the end geometry shown in FIG. 2D is satisfactory for many optical fiber applications when the small oblique portion 6" remaining is confined to the cladding of the fiber. Given the application at hand a sufficient number of slicing steps are performed in order to eliminate part or all of oblique end surface 6 and replace the same with an end surface substantially parallel to the geometrically distinct surface portion 9 previously produced.

The magnitude of the advancement $s$ which is suitably, but not necessarily, the same in each successive slice determines the number of slices N required after the first cut. When $s$ is the same for every slice, N is determined by the relationship.

$$N = \text{first integer greater than } \frac{d \times \operatorname{ctn}\theta}{s} . \qquad (2)$$

For example, where $d \times \operatorname{ctn} \theta$ is 65 microns and $s$ is 25 microns the ratio is 2.6 and $N=3$. In other words, at least 3 slices following the first cut with successive advancements of about one thousandth inch are required in the example in order to produce desirable prepared optical fiber ends squared flush with the sliced plastic according to the method of the invention.

In general the person skilled in the art first selects the appropriate epoxy or other plastic and embeds the optical fiber. A first cut is experimentally made, producing the above described oblique fiber end surface. Experimental slices are then made to determine the maximum value of the advancement $s$ which is practical for producing increasingly perfect perpendicular fiber end faces. Changes in the diamond wedge angle δ and orientation α may be made but the hereinabove suggested values are believed to be satisfactory for most materials combinations to be sliced. The angle α may be set by means of a standard reflection technique such as one utilizing a helium-neon laser. Given the value of $s$, the process is continued through the appropriate number of slices N (equation 2) for each embedded optical fiber. In this way, a repeatable manufacturing method is readily obtained.

The method just described is applicable not only in the preparation of embedded single optical fibers but also to multiple glass fiber ends embedded in linear array (into the plane of FIG. 2), as occurs in optical fiber tapes. Thus, the diamond wedge slices through the epoxy and through each fiber, simultaneously breaking each and every fiber off in parallel in the manner shown in FIGS. 2A–E. After the last slice is complete, all of the fibers and not just one have the desired ends squared flush with the sliced plastic. Furthermore, the fibers can also be embedded in the epoxy so as to be oriented serially with respect to the slicing direction, in which case in each slice the fiber ends are consecutively cut by the diamond wedge and progressively modified in end surface geometry to also yield squared ends when a sufficient number of slices are made.

Figure 3:
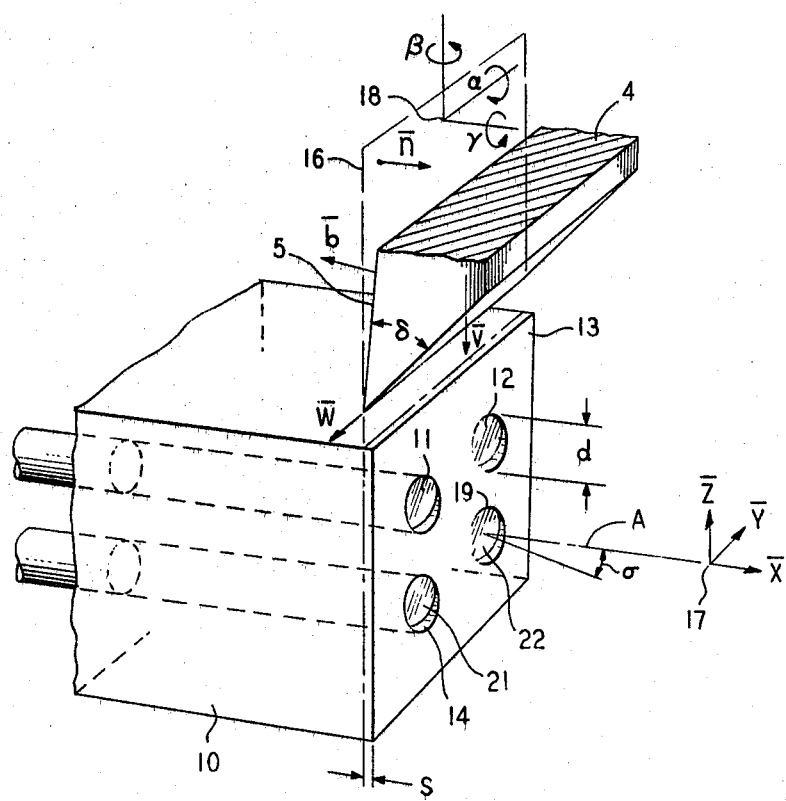
FIG. 3 is a perspective view of an array of optical fibers being prepared in accordance with the invention.

Two dimensional arrays of optical fibers such as are found in optical fiber cable applications may be embedded in epoxy and cut by applying the described slicing method. For instance, FIG. 3 shows optical fibers 11, 12, 21, and 22 embedded in epoxy block 10 and being cut by wedge 4. Each of the fibers has a diameter $d$ and an axis A parallel to vector $\bar{x}$. As shown in FIG. 3, an initial slice has previously produced sliced epoxy surface 13, and respective oblique optical fiber end faces having surface normals making an angle $\sigma$ (sigma) with the vector $\bar{x}$. The oblique geometry results in recesses with a longitudinal dimension 14 equal to $d \times \tan \sigma$, which is equivalent to equation (1). Wedge 4 is used to make additional slices so as to produce ends of desirable modified geometry when the advancement $s$ is less than the longitudinal dimension.

FIG. 3 also suggests that a wide variety of three-dimensional slicing directions and orientations are possible relative to any one or all of the optical fibers 11, 12, 21, and 22 by making adjustments of the wedge 4 and apparatus for propelling it, not shown.

Vectors are used to describe the directions. The right hand vector cross product is denoted by "$\otimes$" and the vector inner product, also known as the scalar product or dot product, is denoted by "$\cdot$" herein. A unit vector is a vector of unit length in a given direction.

A sequence of slices may in general be described in terms of an $x$, $y$, $z$ coordinate system 17 defined by the initial slice in plane 13, where $\bar{x}$ is a unit vector directed along a fiber axis A from the inside to the outside of the plastic to be sliced, $\bar{z}$ is a unit vector in the direction perpendicular from fiber axis A of fiber 22 to point 19 where the wedge 4 first has contacted the fiber 22, and $\bar{y}$ is perpendicular to the plane formed by $\bar{z}$ and $\bar{x}$ and is equal to $\bar{z} \otimes \bar{x}$.

Each successive slice has a plane such as 16 defined by a unit vector $\bar{w}$ along the edge of wedge 4, a unit vector $\bar{v}$ in the direction of the velocity of wedge 4 when it contacts the fiber, and the advancement $s$ beyond the previous slice. Advancement was previously defined hereinabove as the distance along the fiber axis A between perpendiculars dropped thereto from successive initial points of contact between the wedge 4 and a given fiber such as 22. It will be noted that the slicing plane has a unit surface normal vector $\bar{n}$ equal to $\bar{w} \otimes \bar{v}$. The back of the wedge near the point of contact has a distinct surface normal $\bar{b}$.

Certain angles useful in describing the slicing method may also be defined as follows.

Wedge pitch angle $\alpha$ (alpha):

$$\cos \alpha = -\bar{b} \cdot \bar{n} \tag{3}$$

Wedge yaw angle $\beta$ (beta):

$$\sin \beta = \bar{w} \cdot \bar{x} \tag{4}$$

Wedge roll angle $\gamma$ (gamma):

$$\sin \gamma = -\bar{w} \cdot \bar{z} \tag{5}$$

Wedge angle $\delta$ (delta):

$$\sim 20° < \delta < \epsilon - \alpha \tag{6}$$

where

Slicing orientation angle $\epsilon$ (epsilon):

$$\sin \epsilon = \bar{x} \cdot \bar{n} \tag{7}$$

In addition, the wedge might be brought against a fiber so that it saws somewhat across the fiber in which case a sawing ratio $Q_s$ may be defined as $$Q_s = \bar{v} \cdot \bar{w}. \tag{8}$$

In the terms just defined, a specific example of the inventive method is described as having a wedge pitch angle of 2°, wedge yaw angle of 0°, wedge roll angle of 0°, wedge angle of 50°, and slicing orientation angle of 90° with advancements of 1 mil and a sawing ratio of 0.

In all cases it is to be understood that the description of specific method examples herein is merely illustrative of many more method embodiments of the invention. The disclosure of specific embodiments and principles of the invention is intended to enable the person skilled in the art to make modifications when necessary in accordance with the principles of the invention so that the utility of the invention may be fully realized.

I claim:

1. In a method of preparing one or more brittle fiber ends each one of which has a respective axis and sliceable material shrunk thereon, the steps comprising
   initially slicing through said material and each said fiber end in a slicing plane, thereby to produce with respect to each said end a substantially planar cut fiber end surface oblique relative to said slicing plane, each said cut end having a longitudinal dimension along its respective axis;
   and again slicing in a parallel plane with an advancement of said slicing plane not in excess of said longitudinal dimension so that a portion of each said oblique cut end surface is replaced with a respective surface portion parallel to said slicing plane.

2. The fiber end preparation method of claim 1 wherein said method is used to prepare a plurality of fiber ends and said ends are sliced in parallel in each slicing step.

3. The fiber end preparation method of claim 1 wherein said method is used to prepare a plurality of fiber ends and said ends are sliced consecutively in each slicing step.

4. The fiber end preparation method of claim 1 wherein said method further comprises at least one additional slicing step with an advancement not in excess of said longitudinal dimension.

5. The fiber end preparation method of claim 4 wherein said additional slicing step or steps are sufficient to eliminate each said oblique cut end surface and replace the same with an end surface substantially parallel to said distinct surface portion previously produced.

6. The fiber end preparation method of claim 5 wherein each said distinct surface portion is substantially perpendicular to each said fiber axis.

7. The fiber end preparation method of claim 4 wherein said method comprises exactly two additional slicing steps, each with an advancement not in excess of one half of said longitudinal dimension.

8. The fiber end preparation method of claim 1 wherein each said distinct surface portion is substantially perpendicular to its respective fiber axis and said slicing plane in said initial slicing step is substantially perpendicular to each said fiber axis.

9. The fiber end preparation method of claim 8 wherein each said oblique cut end surface has a surface normal making an angle with its respective fiber axis of between 20° and 40°.

10. The fiber end preparation method of claim 1 wherein said method further comprises
shrinking said sliceable material onto each said fiber end previous to said slicing steps.

11. The fiber end preparation method of claim 10 wherein said material is moldable and curably shrinkable and said shrinking step is accomplished by molding and curing said sliceable material around each said fiber end.

12. In a method of preparing one or more glass fiber ends each one of which is embedded in a plastic and has an axis the steps comprising
initially slicing said each said end and said plastic substantially perpendicular to each said axis respectively so as to expose a substantially planar cut surface of said plastic and an oblique surface on each said end, each said oblique surface exhibiting a recess depth relative to said planar cut surface; and
making successive further parallel slices in said plastic and each said end with an advancement prior to each said further slice of less than said recess depth so that successive portions of each said oblique surface are replaced with end surface portions substantially perpendicular to each said axis respectively until the entire surface of each said end is substantially perpendicular to each said axis respectively.

13. The method of claim 12 wherein
each said oblique surface makes an angle $\theta$ relative to each said fiber axis respectively, the diameter of each said fiber is $d$, a maximum advancement of said further slices is $s$ and the number of said further slices equals or exceeds the first integer greater than $$(d \times \operatorname{ctn} \theta)./s$$

14. The method of claim 12 wherein the number of said further slices is at least three.

15. In a method for preparing an end of a glass fiber the steps of
embedding said fiber end in a substance,
initially slicing said substance and said fiber in a plane perpendicular to the fiber axis, with the result of producing an oblique fiber end surface, said substance being such that a subsequent slice with an advancement substantially exceeding one-thousandth inch would reproduce said oblique fiber end surface; and then additionally transversely slicing perpendicular to said fiber axis and said substance at least three times with successive advancements of said slicing of approximately one-thousandth inch or less,
thereby to achieve the result that said fiber end is squared flush with the sliced substance.

16. The method of claim 15 wherein said substance is a moldable plastic having a shrinking characteristic upon curing.

17. The method of claim 16 wherein said plastic is a moldable epoxy.

18. The method of claim 15 wherein said method is employed for preparing a plurality of glass fiber ends and said slicings are utilized to slice said plurality of glass fiber ends substantially simultaneously, whereby said plurality of fiber ends is squared flush with the sliced substance.

19. The method of claim 15 wherein said method is employed for preparing a plurality of glass fiber ends and said slicings are utilized to slice said plurality of glass fiber ends serially, whereby said plurality of fiber ends is squared flush with the sliced substance.

20. The method of claim 15 wherein said method is employed for preparing a two dimensional array of glass fiber ends and said slicings are applied to all of said glass fiber ends, whereby said array of fiber ends is squared flush with the sliced substance.

21. The method of claim 15 wherein said slicing steps are accomplished by means of a slicing wedge and said slicing steps occur at a slicing orientation angle $\epsilon$ of said slicing plane of approximately 90°, said wedge has a pitch angle $\alpha$ between 0° and 4° relative to said slicing plane, and said wedge has a wedge angle $\delta$ between approximately 20° and the difference of said slicing orientation angle $\epsilon$ and said pitch angle $\alpha$.

* * * * *